(12) United States Patent
Kako

(10) Patent No.: US 11,235,541 B2
(45) Date of Patent: Feb. 1, 2022

(54) METHOD FOR THE ADAPTIVE FILLING OF RIGID TOOL CAVITIES

(71) Applicant: Airbus Operations GmbH, Hamburg (DE)

(72) Inventor: Jan-Christoph Kako, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 220 days.

(21) Appl. No.: 16/725,249

(22) Filed: Dec. 23, 2019

(65) Prior Publication Data

US 2020/0207035 A1 Jul. 2, 2020

(30) Foreign Application Priority Data

Dec. 30, 2018 (LU) .................................... 101087

(51) Int. Cl.
*B29C 70/44* (2006.01)
*B29K 105/08* (2006.01)
*B29K 307/04* (2006.01)
*B29L 31/00* (2006.01)
*B29L 31/30* (2006.01)

(52) U.S. Cl.
CPC .... *B29C 70/446* (2013.01); *B29K 2105/0872* (2013.01); *B29K 2307/04* (2013.01); *B29L 2031/003* (2013.01); *B29L 2031/3076* (2013.01)

(58) Field of Classification Search
None
See application file for complete search history.

(56) References Cited

U.S. PATENT DOCUMENTS 6,050,315 A * 4/2000 Deckers .................. B29C 53/82
156/425
2002/0027187 A1 3/2002 Sato et al.
2014/0203477 A1 7/2014 Chapman et al.

FOREIGN PATENT DOCUMENTS

GB 2588967 A * 5/2021
WO WO-2012/032208 A1 * 3/2012

OTHER PUBLICATIONS

Luxembourg Search Report; priority document.

* cited by examiner

*Primary Examiner* — Jeffry H Aftergut
(74) *Attorney, Agent, or Firm* — Greer, Burns & Crain, Ltd.

(57) ABSTRACT

A method for the production of stiffened components made of fiber-reinforced composite material using two rigid form tools which are suitable for covering the longer end sides of T-shaped preformed reinforcing fibers, using a folded hose core and inflation of the hose core so as to exert pressure on the end side of the preformed reinforcing fibers.

12 Claims, 2 Drawing Sheets

METHOD FOR THE ADAPTIVE FILLING OF RIGID TOOL CAVITIES

CROSS-REFERENCES TO RELATED APPLICATIONS

This application claims the benefit of the Luxembourg patent application No. 101087 filed on Dec. 30, 2018, the entire disclosures of which are incorporated herein by way of reference.

FIELD OF THE INVENTION

The invention relates to a method for the adaptive filling of rigid tool cavities, in particular in the context of the production of T-shaped reinforcing elements made of fiber-reinforced composite material.

BACKGROUND OF THE INVENTION

Currently, and in particular in the aerospace industry, a great number of structural elements use composite materials with an organic matrix and endless fibers of CFRP (carbon fiber-reinforced polymer). It is also possible to use CFRP for the production of wings, control surfaces, fuselage shells, rudders, spoilers or control flaps. A known method for the production of these elements uses pre-preg technology. A first step involves flat assembly of composite pre-preg plies for each element. Then a conventional hot-forming process or a press-forming method is used to produce a laminated preform of the element with the required shape. The laminated preform is then cured.

The invention relates to a method for the adaptive filling of rigid tool cavities, in particular in the context of the production of T-shaped reinforcing elements made of fiber-reinforced composite material, referred to as stringers and frames. T-shaped reinforcing elements of this kind can be produced by applying the T-shaped preform to the structure that is to be reinforced, for example a skin panel. Then, essentially angular form tools are positioned along the longitudinal axis of the preform so that these tools fix and clamp and enclose at the top that part of the preform which is arranged at right angles to the structure to be reinforced. The preform and the curing tools are cured together in an autoclave. The cured stringer is obtained upon removal of the tools and represents a negative image of the form tools used.

In the context of production using hard-enclosing tools of this kind, reducing the cured dimensions of the stringer requires that these tools be modified since otherwise the resulting void in this tool will become filled with portions of the part, leading to quality problems (e.g., porosity and defects in fiber orientation owing to the pressure gradient and inadequate consolidation in the part). Undesired elevations of this kind on the surface of the component can harm the optical impression of the component, serve no technical function and lead to unnecessary and avoidable weight of the component. The excess material can be removed mechanically by grinding or milling. This is a laborious and unnecessary process step. There is therefore the desire to avoid this kind of finishing work on components made of carbon fiber-reinforced polymers or other fiber-reinforced composite material components.

Modifying the metallic tool void is normally carried out by means of metalworking techniques. Besides the re-processing of parts, generally, where possible, either subsequent milling is carried out or, in the case of relatively large changes, it is possible to use fitting inserts (either screwed or welded). In the case of minor modifications (10 mm), use is often also made of a (laser) surface coating.

Besides modifying the tool, use is often made of single-use or reusable filler pieces, predominantly made of a rubber-like material. This generally leads to problems with the production costs and handling costs of these parts and the short lifespan over which they can be used reliably and without loss of quality.

A modified process makes it possible to remove the tools from inside the vacuum bag to the outside and to produce the parts without it being necessary to completely enclose the part (the "direct packing" principle). However, the use of this method is not without problems: it requires renewed assessment of the quality of the parts, in particular if the inherent curvature of the part leads to longitudinal compression of the stringer track during production. Then, the specific production conditions of a completely enclosed hard tool permit a resulting part having a better fiber orientation.

Proceeding from the above, there was hitherto no method permitting the use of rigid curing tools, with the associated high component quality, while at the same time permitting adaptations to the component geometry, in particular the height.

SUMMARY OF THE INVENTION

Surprisingly, and in a manner not foreseeable to a person skilled in the art, it has now been found that a method for the production of stiffened components made of fiber-reinforced composite material, comprising the following steps:

providing a component that is to be reinforced, laying down, on this component that is to be reinforced, reinforcing fibers that are preformed to form a T-shaped reinforcing element, providing two rigid form tools which are suitable for covering the longer end sides of the T-shaped preformed reinforcing fibers, inserting a folded hose core into the rigid form tools, positioning the rigid form tools on the longer end sides of the T-shaped preformed reinforcing fibers so that the folded hose core comes to rest above that end side of the preformed reinforcing fibers that is oriented away from the component that is to be reinforced, pressing the rigid form tools against the preformed reinforcing fibers, inflating the hose core so as to exert pressure on that end side of the preformed reinforcing fibers that is oriented away from the component that is to be reinforced, consolidating the reinforcing fibers, remedies the drawbacks of the prior art.

The proposed method has the advantage of a cost-effective solution for adapting the tool cavity to the actual part, without the negative effects of a complex, highly controlled process or the uncontrolled effect of the pressure in the autoclave on the upper edge of the stringer.

It is possible to produce reduced stringer heights without a complete overhaul of the available tools and without being dependent on material-intensive trimming which simply involves subsequent removal of part of the stringer, which leads to an increase in waste.

Furthermore, this method is suitable for adding material in a defined manner to the component edge, which leads to an almost near-net-shape process; depending on the edge face and position tolerances, however, subsequent cutting of the added material may be necessary. The structural material used can be very extensively utilized. The added material can take on additional functions such as galvanic corrosion protection or edge impact protection.

One aspect of the invention is the use of a folded, circular film profile within the closed form void of the stringer tool in the specific case of the stringer laminate not fully filling the void in the cross section.

The tube profile comprises a closed tube profile which is folded so as to achieve a minimal cross section in order to simplify insertion into the curing tool. After inflation, the profile fills the entire void in the curing tool.

After positioning of the reinforcing elements (stringers), the normal next step is the preparation of the vacuum bag. In this process step, the open end must be connected to a distributor pipe system which provides an additional connection from the base tool to the outer connection port.

Once the final vacuum setup has been completed and the vacuum bag is sealed and the vacuum is applied, and immediately prior to the beginning of the curing cycle, the system with the folded profiles is inflated with minimal pressure difference so that the void is filled without excessive application of force.

The overall process during the curing cycle is divided into different phases. In the first pre-curing phase, the tube profile is evacuated before or at the same time as the vacuum bag. This is done in order to permit optimal emptying of the entire part before curing begins.

After the end of this evacuation, the tube profile is inflated with a slight overpressure relative to the internal pressure of the bag. This causes the profile to unfold and fill the remaining void. If additional material is applied for the purpose of covering the edge, this is now pressed against the part edge owing to the complete emptying of the part. This material can be joined without air inclusions, which ensures a good join.

The internal pressure of the profile must be determined on the basis of the specific requirements of the parts. This is a balance between the negative effects of excessive application of pressure on the part edge and the restriction of the resin flow from the part. It need not necessarily be below ambient pressure.

Once the structural material has reached a sufficient degree of curing, the inner profile pressure can be raised to the outer curing pressure or expanded to ambient pressure.

It is preferred for the hose core to be made of a polymer film, preferably polyamide. It is also preferred for the hose core to be made of silicone. It is further preferred for the hose core to have a non-stick coating, or for a release agent to cover at least part of its surface.

The profile can be made of a tight material with operating temperatures above the curing temperature and resistance to the uncured resin systems. The same requirements apply for conventional vacuum bag material; this is normally achieved using polyamide films. The release properties of the material are optionally desirable but necessary only if net-shape designs without subsequent cutting are used. For that purpose, it is possible to use a separable multi-layer material. Alternatively, it is possible to wrap around the tube profile an additional strip of separating material which only covers the subsequently cured part. Choosing a stiffer version of this additional material permits the creation of a smoother surface of the cured edge.

A rubber-like hose (e.g., silicone) can be used, but it must be developed subject to the same geometric considerations (overall perimeter after unfolding>perimeter of the void) since the inflation of the void should not lead to a stress state in the material.

It is preferable for a curable material to be additionally introduced into the rigid form tools, between the hose core and the reinforcing fibers. It is particularly preferred for the curable material, when cured, to provide protection from electrolytic corrosion and/or have indicator properties, particularly preferably the curable material has indicator properties with respect to impact events. Another perspective is the addition, to the profile, of a material which, in the process, is to be joined to the part edge. Any kind of adaptable material (e.g., uncured or soft) can be added so as to permit an edge with settable properties.

In the case of aircraft wing stringers, for example, the addition of an uncured resin paste to the tube element makes it possible to cover the component edge with the normally desired galvanic corrosion protection and can also act as an impact identification or protection material, making it easier to see the impact on the rim. Impact damage affects the strength of the material in the stringer structure, and making early identification of the damage possible is critical. A large number of materials can be used for this purpose. In most cases, an epoxy paste or an epoxy foam material (e.g., splice filler for honeycomb applications) can be used in order to achieve good compatibility with a structural composite material and the ability to completely fill an uneven rim of a part, which is the result of the known processing, for example in the case of wings in the precured state.

While integrating the galvanic protection—the trimmed filler material also has the electrical insulation properties— leads to a reduction in production costs, the improvement in the edge impact behavior can also substantially reduce the necessary structural weight of the component.

It is also preferred for the reinforcing fibers to be dry carbon fibers. It is moreover preferred for the reinforcing fibers to be carbon fibers pre-impregnated with matrix resin. The invention also covers an aircraft component which can be obtained using a method according to the invention. The above-described aspects and further aspects, features and advantages of the invention can also be taken from the examples of the embodiments which are described below with reference to the appended drawings.

DETAILED DESCRIPTION OF THE PREFERRED EMBODIMENTS

Figure 1:
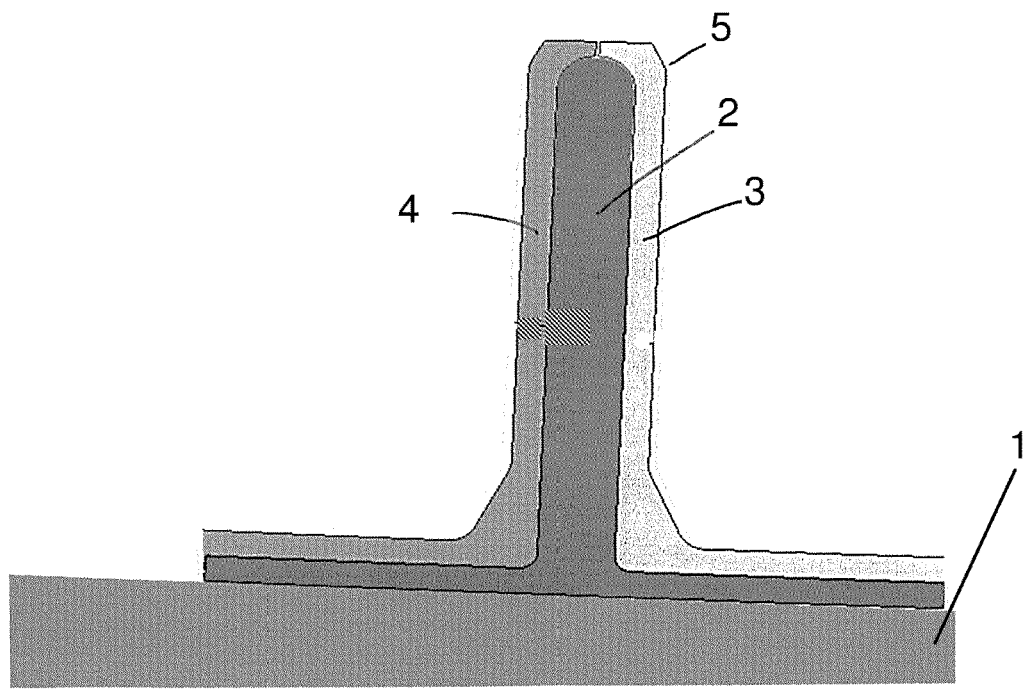
FIG. 1 is a side sectional view of a conventional setup for producing a reinforcing profile.

FIG. 1 shows a conventional setup for producing a reinforcing profile with curing forms. In that context, the preformed reinforcing material 2 is applied to the structure 1 that is to be reinforced, whereupon the reinforcing material 2 is enclosed in two hard essentially angular curing forms 3 and 4. These forms 3 and 4 have a first leg that is essentially parallel to the structure 1 to be reinforced, adjoining this is a second leg which is approximately perpendicular to the structure 1 to be reinforced, and adjoining this is a third leg whose end faces are a contact face between the forms 3 and 4. The two forms 3 and 4 can form a cavity into which the preformed reinforcing material 2 can be introduced. The entire arrangement is covered with a vacuum film 5. Through the application of a vacuum, the fiber material 2 is compressed with the aid of the curing forms 3 and 4. The curing of the curable matrix material consolidates the reinforcing fibers and fixes the finished stringer onto the component 1 that is to be reinforced. Curing can be carried out in an autoclave, that is to say, under pressure and elevated temperature.

Figure 2:
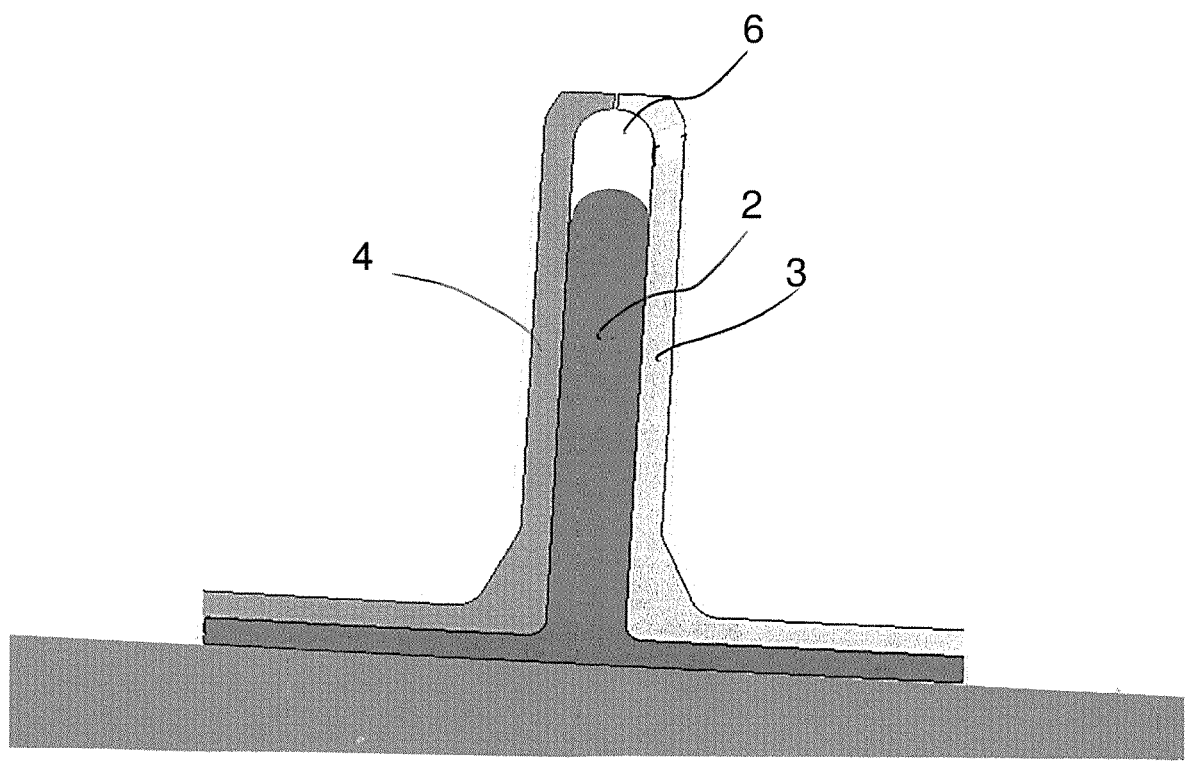
FIG. 2 is a side sectional view of an embodiment of a setup according to the present invention.

FIG. 2 shows an arrangement according to the invention for consolidating T-shaped reinforcing profiles. In that context, the angular curing forms 3 and 4 are designed such that a void or cavity 6 can exist above the inserted reinforcing material 2 in the case of corresponding dimensions of the reinforcing material. Curing forms of this kind make it possible to produce T-shaped reinforcing profiles having varying lengths of the leg that is perpendicular to the structure to be reinforced. However, the material quality and surface quality of the upper edge of the reinforcing material 2 can be variable.

Figure 3A:
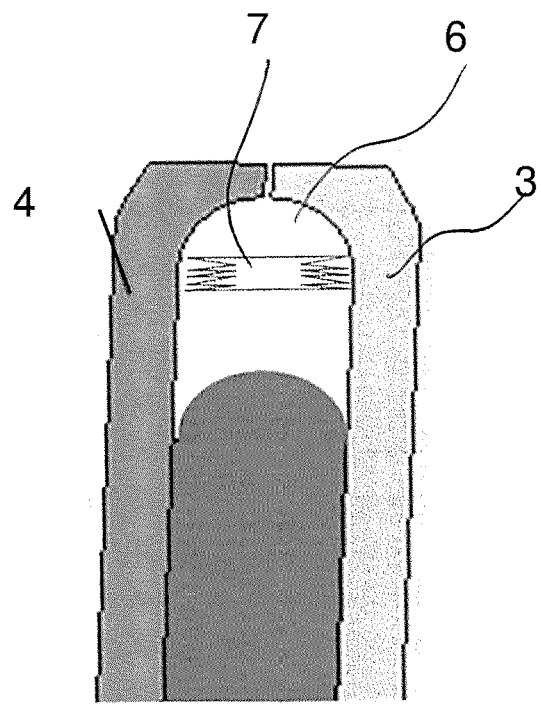
FIGS. 3a and 3b are a partial side sectional view of an embodiment of a setup of the present invention.
Figure 3B:
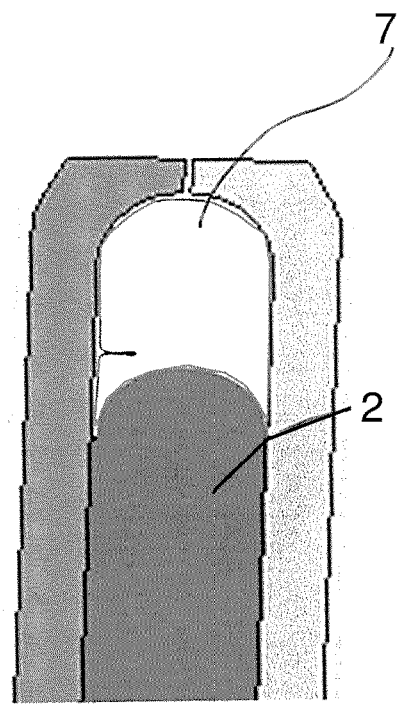

FIG. 3*a* shows the inflatable and folded hose-shaped profile 7 which lies within the cavity 6. Hose-shaped profiles of this kind can also be referred to as hose cores. At the start of the curing cycle, the hose-shaped profile 7 is folded in such a manner that it takes up a small volume within the cavity 6. The hose-shaped profile is designed to be inflatable. Inflating the hose-shaped profile 7, as shown in FIG. 3*b*, can serve to fill the cavity 6 within the curing tool 3 and 4 and to exert pressure on the end side of the reinforcing fibers. This makes it possible to improve the surface quality at the end side of the reinforcing material 2 and to prevent resin from issuing into the cavity 6.

Figure 4A:
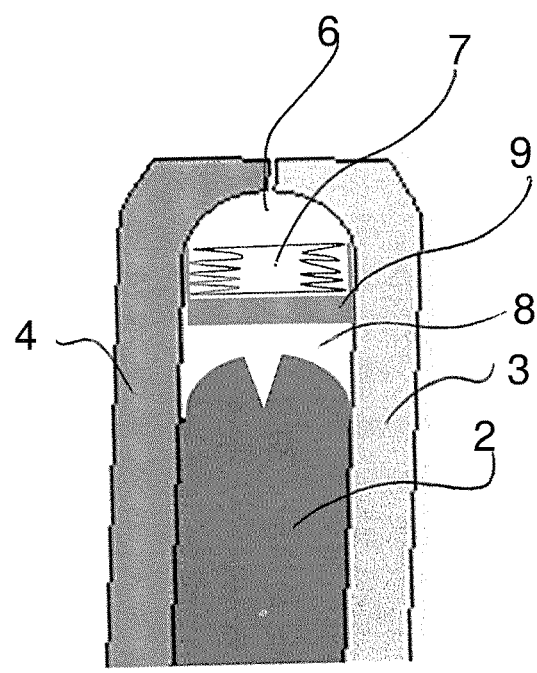
FIGS. 4a and 4b are a partial side sectional view of an embodiment of a setup of the present invention.
Figure 4B:
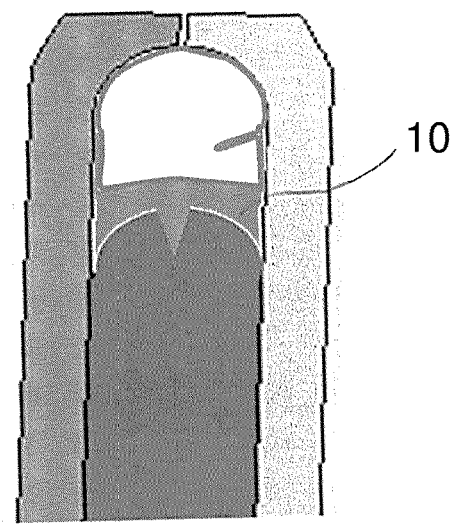

FIG. 4*a* shows a further embodiment of the method according to the invention, in which the hose-shaped profile 7 is introduced into the cavity 6 in such a manner that a void 8 remains free between the profile 7 and the reinforcing fibers 2. Further curable material 9 can be introduced into this void 8. When the hose-shaped profile 7 is inflated, as shown in FIG. 4*b*, the curable material 9 is pressed onto the end side of the reinforcing fibers 2 so that the end side thereof is coated with the consolidated material 10.

It is noted that the described embodiments are purely illustrative and non-limiting. While the invention has been illustrated and described in detail in the examples and the above description, such illustrations and descriptions are intended to be purely illustrative or exemplary and non-limiting, and hence the invention is not restricted by the disclosed embodiments. In the claims, the word "having" does not exclude other elements and the indefinite article "a" does not exclude a plurality.

Only the circumstance that certain features are named in various dependent claims does not restrict the subject matter of the invention. Combinations of these features can also be advantageously used.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

1 Structure to be reinforced
2 Reinforcing material
3 Curing form or rigid form tool
4 Curing form or rigid form tool
5 Vacuum film
6 Cavity
7 Hose-shaped profile
8 Void
9 Further curable material
10 Consolidated material

The invention claimed is:

1. A method for production of stiffened component made of fiber-reinforced composite material, comprising the following steps:
   providing a component that is to be reinforced,
   laying down, on this component that is to be reinforced, reinforcing fibers that are preformed to form a T-shaped reinforcing element,
   providing two rigid form tools which are suitable for covering longer end sides of the T-shaped preformed reinforcing fibers,
   inserting a folded hose core into the rigid form tools,
   positioning the rigid form tools on the longer end sides of the T-shaped preformed reinforcing fibers so that the folded hose core comes to rest above an end side of the preformed reinforcing fibers that is oriented away from the component that is to be reinforced,
   pressing the rigid form tools against the preformed reinforcing fibers,
   inflating the hose core so as to exert pressure on that end side of the preformed reinforcing fibers that is oriented away from the component that is to be reinforced,
   consolidating the reinforcing fibers.

2. The method according to claim 1, wherein a curable material is additionally introduced into the rigid form tools, between the folded hose core and the reinforcing fibers.

3. The method according to claim 2, wherein the curable material, when cured, provides protection from electrolytic corrosion.

4. The method according claim 2, wherein the curable material, when cured, has indicator properties.

5. The method according to claim 1, wherein the folded hose core is made of a polymer film.

6. The method according to claim 5, wherein the polymer film comprises polyamide.

7. The method according to claim 1, wherein the folded hose core is made of silicone.

8. The method according to claim 1, wherein the folded hose core has a non-stick coating.

9. The method according to claim 1, wherein a release agent covers at least part of a surface of the folded hose core.

10. The method according to claim 1, wherein the reinforcing fibers are dry carbon fibers.

11. The method according to claim 1, wherein the reinforcing fibers are carbon fibers pre-impregnated with matrix resin.

12. The method according to claim 1 wherein the component comprises an aircraft component.

* * * * *